(12) United States Patent
Atkinson

(10) Patent No.: US 10,131,447 B2
(45) Date of Patent: Nov. 20, 2018

(54) GLIDE PATH INDICATOR

(71) Applicant: BAE SYSTEMS PLC, London (GB)

(72) Inventor: David Charles Atkinson, Lancashire (GB)

(73) Assignee: BAE Systems plc, London (GB)

( * ) Notice: Subject to any disclaimer, the term of this patent is extended or adjusted under 35 U.S.C. 154(b) by 36 days.

(21) Appl. No.: 15/322,249

(22) PCT Filed: Jun. 26, 2015

(86) PCT No.: PCT/GB2015/000199
§ 371 (c)(1),
(2) Date: Dec. 27, 2016

(87) PCT Pub. No.: WO2015/198003
PCT Pub. Date: Dec. 30, 2015

(65) Prior Publication Data
US 2018/0105288 A1    Apr. 19, 2018

(30) Foreign Application Priority Data

Jun. 25, 2014   (GB) .................................. 1411242.9

(51) Int. Cl.
*B64F 1/18* (2006.01)
*B64F 1/20* (2006.01)
*F21W 111/06* (2006.01)

(52) U.S. Cl.
CPC ............ *B64F 1/20* (2013.01); *B63B 2201/08* (2013.01); *F21W 2111/06* (2013.01)

(58) Field of Classification Search
CPC ...... B64F 1/20; B64F 1/18; B64F 1/00; B64F 1/205; B64F 1/36; B63B 2201/08;
(Continued)

(56) References Cited

U.S. PATENT DOCUMENTS

| | | | |
|---|---|---|---|
| 3,452,597 A | 7/1969 | Flanders | |
| 3,452,697 A | 7/1969 | Flanders | |

(Continued)

FOREIGN PATENT DOCUMENTS

| | | |
|---|---|---|
| CN | 103287584 A | 9/2013 |
| DE | 4242331 A1 | 6/1994 |

(Continued)

OTHER PUBLICATIONS

International Preliminary Report on Patentability for Application No. PCT/GB2015/000199 dated Dec. 27, 2016, 8 pages.

(Continued)

*Primary Examiner* — Anh V La
(74) *Attorney, Agent, or Firm* — Maine Cernota & Rardin

(57) ABSTRACT

Disclosed is a glide path indicator (2) comprising a light emitter (20) configured to emit a visible light signal that defines a glide path (14) for use by a pilot of an approaching aircraft (10), and a camera (22) configured to capture images of the approaching aircraft (10), the camera (22) being arranged such that at least part of the glide path (14) defined by the light emitter (20) is located within a field of view of the camera (22). The glide path indicator (2) may be mounted to a vehicle (4), for example, an aircraft carrier. The glide path indicator (2) may further comprise a stabilization module (26) configured to stabilize the light emitter (20) and the camera (22) so as to reduce or eliminate the effects of the vehicle's motion on the glide path (14) and the field of view of the camera (22).

12 Claims, 1 Drawing Sheet

(58) Field of Classification Search
CPC .... B63B 35/50; F21W 2111/06; G02B 27/01; G02B 2027/0141; B64D 45/04; G05D 1/0684; G01S 13/86; G01S 13/913; G01S 13/882; G01S 13/865; G01S 13/94; G01S 17/023; G01S 7/4802; G01S 17/933; G01S 7/411; G01S 17/88; G01S 13/60
USPC ................ 340/953, 945, 950, 956; 73/178 T
See application file for complete search history.

(56) References Cited

U.S. PATENT DOCUMENTS

| | | | |
|---|---|---|---|
| 4,414,532 A | 11/1983 | Kaul | |
| 5,017,930 A * | 5/1991 | Stoltz | G01S 5/0009 342/410 |
| 6,239,725 B1 | 5/2001 | Bray | |
| 6,917,309 B2 * | 7/2005 | Nitzan | B64F 1/18 340/945 |
| 2006/0119839 A1 * | 6/2006 | Bertin | B64F 1/20 356/139.03 |
| 2011/0121997 A1 * | 5/2011 | Paines | B64F 1/20 340/945 |
| 2012/0293987 A1 * | 11/2012 | Espedal | B64F 1/20 362/145 |

FOREIGN PATENT DOCUMENTS

| | | |
|---|---|---|
| FR | 2937169 A1 | 4/2010 |
| RU | 2234440 C1 | 8/2004 |
| RU | 2317233 C1 | 2/2008 |
| WO | 2010072996 A1 | 7/2010 |

OTHER PUBLICATIONS

International Search Report and Written Opinion of Application No. PCT/GB2015/000199 dated Sep. 17, 2015, 11 pages.
Search Report of Application No. GB1411242.9, dated Dec. 18, 2014, 2 pages.

* cited by examiner

GLIDE PATH INDICATOR

RELATED APPLICATIONS

This application is a National Phase application filed under 35 USC § 371 of PCT Application No. PCT/GB2015/000199 with an International filing date of Jun. 26, 2015, which claims priority of GB Patent Application GB1411242.9 filed Jun. 25, 2014. Each of these applications is herein incorporated by reference in its entirety for all purposes.

FIELD OF THE INVENTION

The present invention relates to an aircraft landing aid, or more particularly an aircraft glide path indicator of the optical type for guiding an aircraft to a landing.

BACKGROUND

Glide path indicators (GPIs), which are also known as glide path indicators, visual glide slope indicators (VGSIs), and visual glideslope indicators, are devices that use one or more lights or light emitters to assist a pilot in landing an airplane, for example, at an airport, ship flight deck, oil and gas platform flight deck or on an aircraft carrier.

The lights of a glide path indicator provide visual descent guidance to a pilot of an aircraft during landing of that aircraft on a runway by defining a vertical glide path, or approach path. The glide path indicator may indicate to the pilot whether that aircraft is too high, too low, or established on the proper descent profile for an optimum landing.

It is known to stabilise glide path indicators used onboard ships (e.g. aircraft carriers) to account for motion of the ship such that a constant (i.e. unchanging) glide path is indicated to the pilot of an approaching aircraft.

SUMMARY OF THE INVENTION

In a first aspect, the present invention provides a glide path indicator comprising a light emitter configured to emit a visible light signal that defines a glide path for use by a pilot of an approaching aircraft, and a camera configured to capture images of the approaching aircraft, the camera being arranged such that at least part of the glide path defined by the light emitter is located within the field of view of the camera.

The camera may be arranged such that the glide path defined by the light emitter is wholly located within the field of view of the camera.

The glide path indicator may be configured to be mounted to a vehicle, for example, a ship.

The glide path indicator may further comprise a first stabilisation module configured to stabilise the light emitter so as to reduce or eliminate the effects of the vehicle's motion on the glide path.

The glide path indicator may further comprise a second stabilisation module configured to stabilise the camera so as to reduce or eliminate the effects of the vehicle's motion on the camera's field of view.

The light emitter and the camera may be stabilised by a common stabilisation module.

The light emitter and the camera may be coupled together such that the position and orientation of the camera with respect to the light emitter is fixed.

The glide path indicator may further comprise means for preventing or opposing light emitted by the light emitter from being received by the camera.

The means for preventing or opposing light emitted by the light emitter from being received by the camera may comprise means selected from the group consisting of an opaque screen located between the light emitter and the camera, a filter configured to filter light being received by the camera, the filter being configured to block only light having a wavelength equal to that of the light emitted by the light emitter, and a switch operable to switch the glide path indicator between a first state and a second state. The first state may be a state in which the glide path indicator emits light and does not capture images. The second state may be a state in which the glide path indicator does not emit light and captures images.

The glide path indicator may comprise a transmitter configured to transmit, to an entity remote from the glide path indicator, the images captured by the camera.

The light emitter may be a pulsating visual approach slope indicator.

In a further aspect, the present invention provides a vehicle comprising a glide path indicator according to the first aspect.

The vehicle may be a ship.

In a further aspect, the present invention provides a method of assessing a descent profile of an aircraft during a landing operation. The method comprises providing a glide path indicator, the glide path indicator comprising a light emitter configured to emit a visible light signal that defines a glide path for use by a pilot of the aircraft during the landing operation, and a camera configured to capture images of the aircraft during the landing operation, the camera being arranged such that at least part of the glide path defined by the light emitter is located within the field of view of the camera. The method further comprises emitting, by the light emitter, a visible light signal so as to define a glide path for use by a pilot of the aircraft, imaging, by the camera of the glide path indicator, the aircraft, and, using the images of the aircraft, determining an assessment of a descent profile of the aircraft.

The method may further comprise, using the determined assessment, determining an action that, if performed by the aircraft, would establish the aircraft on the glide path, and controlling the aircraft to perform the determined action.

DETAILED DESCRIPTION

Figure 1:
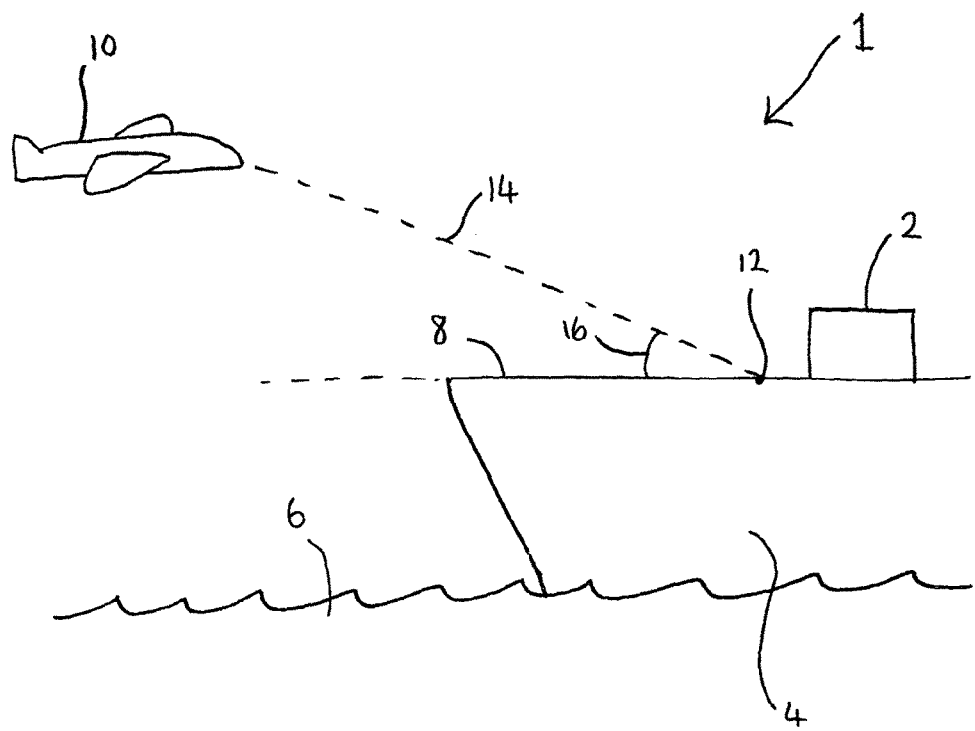
FIG. 1 is a schematic illustration (not to scale) showing a scenario in which an embodiment of a glide path indicator is implemented.

FIG. 1 is a schematic illustration (not to scale) showing a scenario 1 in which an embodiment of a glide path indicator 2 is implemented.

The glide path indicator 2 is described in more detail later below with reference to FIG. 2.

In the scenario 1, the glide path indicator 2 is located onboard an aircraft carrier 4. The aircraft carrier 4 is afloat on a body of water 6, e.g. an ocean or sea. The aircraft carrier 4 comprises a runway 8 upon which an aircraft 10 is to land. A desired or optimum landing position for the aircraft 10 on the runway 8 is hereinafter referred to as the "optimum landing position" and is indicated in FIG. 1 by the reference numeral 12.

In the scenario 1, as described in more detail later below with reference to FIG. 2, the glide path indicator 2 indicates, to the pilot of the aircraft 10, a glide path 14. The glide path 14 is oblique, i.e. at an angle, to the runway 8. The angle between the glide path 14 and the runway 8 is indicated in FIG. 1 by the reference numeral 16.

The glide path 14 is such that, if the glide path 14 is followed by the aircraft 2, the aircraft 10 would land on the runway 8 at the optimum landing position 12.

The angle 16 between the glide path 14 and the runway 8 is such that, if the glide path 14 is followed by the aircraft 2, the aircraft 10 would have a descent profile corresponding to a desired, or optimum, landing. In this scenario 1, the angle 16 is 3°. However, in other embodiments, the angle 16 may be a different value. Preferably, the angle is between 2° and 8°.

Figure 2:
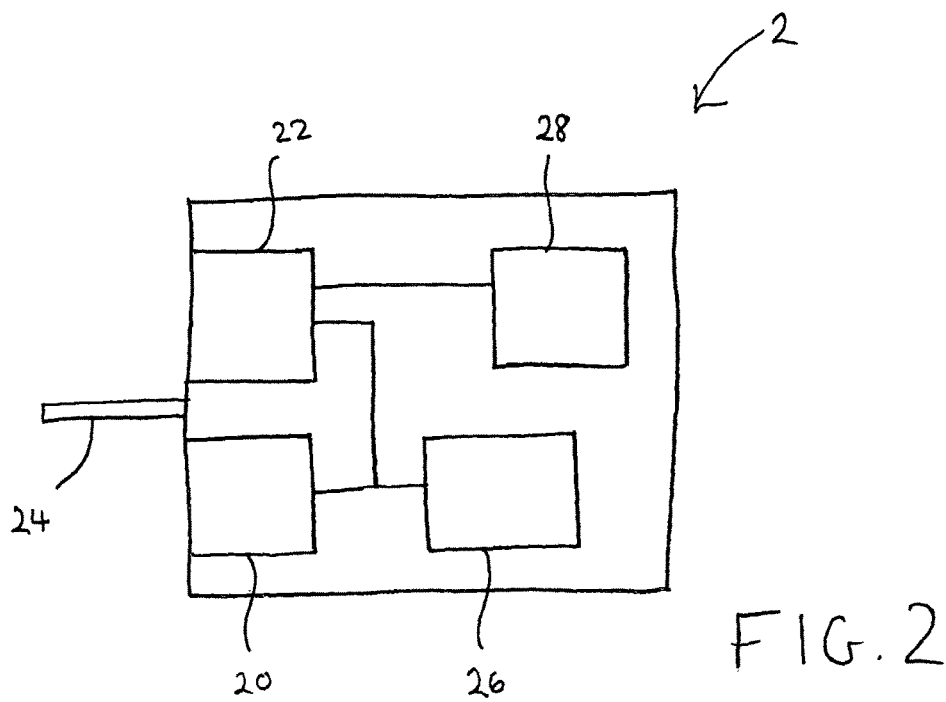
FIG. 2 is a schematic illustration (not to scale) showing an embodiment of the glide path indicator.

FIG. 2 is a schematic illustration (not to scale) showing an embodiment of the glide path indicator 2.

In this embodiment, the glide path indicator 2 comprises a light emitter 20, an integral camera 22, a screen 24, a stabilisation module 26, and a transmitter 28.

The light emitter 20 may include one or more light emitting elements, such as light emitting diodes (LEDs) or lamps.

The light emitter 20 emits light which is visible to the pilot of the approaching aircraft 10.

In the embodiment, the signal format of the light emitted by the light emitter 20 is such that:
  if the aircraft 10 is established on the proper descent profile, i.e. if the aircraft 10 is on the glide path 14, the light emitted by the light emitter 20 appears to the pilot as a solid green light;
  if the aircraft 10 is above the proper descent profile, i.e. if the aircraft 10 is above the glide path 14, the light emitted by the light emitter 20 appears to the pilot as a pulsing or flashing green light; and
  if the aircraft 10 is below the proper descent profile, i.e. if the aircraft 10 is below the glide path 14, the light emitted by the light emitter 20 appears to the pilot as a pulsing or flashing red light.

Thus, the light emitter 20 may be regarded as a "pulsating visual approach slope indicator" (PVASI).

Advantageously, the signal format of the light emitter 20 tends to facilitate the pilot in determining the position of the aircraft 10 relative to the runway 8, and therefore facilitates in determining the corrective action needed to position the aircraft 10 on the glide path 14.

In some embodiments, the light emitted by the light emitter 20 appears as a solid green light if the aircraft 10 is within a predetermined angular range, e.g. ±0.5°, of the glide path 14.

In some embodiments, if the aircraft 10 is only slightly below the glide path 14, e.g. below the glide path 14 by between 0.5° to 1°, the light emitted by the light emitter 20 appears as a solid red light.

In this embodiment, the light emitter 20 is coupled to the stabilisation module 26. The stabilisation module 26 is configured to "stabilise" the light emitter 20 with respect to the movement of the aircraft carrier 4 so that the glide path 14 presented to the pilot of the aircraft 10 is substantially steady and unchanging.

This stabilisation of the light emitter 20 (and thereby the glide path 14) by the stabilisation module 26 may be performed in any appropriate way. For example, in some embodiments, the light emitter 20 is mounted on an electro-hydraulic stabilised platform (or a different appropriate type of platform), and the stabilisation module 26 is configured to move the platform in an opposite direction to the aircraft carrier's movement about the aircraft carrier's pitch, roll and/or yaw axes so as to stabilise the glide path 14.

In some embodiments, the stabilisation module 26 receives measurements of the motion of the aircraft carrier 4 (for example, the aircraft carrier's movement about its pitch, roll and/or yaw axes) from an entity remote from the glide path indicator 2. These measurements may then be used by the stabilisation module 26 to stabilise the light emitter 20.

In some embodiments, the stabilisation module 26 comprises one or more sensors for measuring the motion of the aircraft carrier 4 (for example, the aircraft carrier's movement about its pitch, roll and/or yaw axes). These measurements may then be used by the stabilisation module 26 to stabilise the light emitter 20.

In this embodiment, the camera 22 is a visible light detecting camera. The camera 22 is configured to capture images of the aircraft 10 during the aircraft's approach to the runway 8 (i.e. during a landing operation).

In this embodiment, the camera 22 is coupled to the light emitter 20 such that the facing of the camera 22, i.e. the camera's "field of view", "angle of view", or "line of sight", is directed along the glide path 14 defined by the light emitter 20. In other words, in this embodiment, the glide path 14 defined by the light emitter 20 is wholly located within the camera's angle of view. The terms "facing", "field of view", "angle of view", and "line of sight" are used herein interchangeably to refer to extent of the observable world that is able to be imaged by the camera 22 at a given moment.

Preferably, the camera 22 and the light emitter 20 are coupled together such that the position and orientation of the camera 22 with respect to the light emitter 20 is fixed.

In this embodiment, the camera 22 is coupled to the stabilisation module 26. The stabilisation module 26 is configured to "stabilise" the camera 22 with respect to the movement of the aircraft carrier 4 so that the facing of the camera 22 is always directed along the glide path 14 (which is also stabilised, i.e. moved with respect to the aircraft carrier 4, by the stabilisation module 26).

This stabilisation of the camera 22 by the stabilisation module 26 may be performed in any appropriate way. For example, in some embodiments, the camera 22 is mounted on an electro-hydraulic stabilised platform, or a different appropriate type of platform, and the stabilisation module 26 is configured to move the platform in an opposite direction to the aircraft carrier's movement about the aircraft carrier's pitch, roll and/or yaw axes so as to stabilise the glide path 14. For example, the camera 22 may be mounted to the same stabilised platform as the light emitter 20.

In some embodiments, the stabilisation module 26 receives measurements of the motion of the aircraft carrier 4 from an entity remote from the glide path indicator 2, which may then be used to stabilise the camera 22.

In some embodiments, the stabilisation module 26 comprises one or more sensors for measuring the motion of the aircraft carrier 4. These measurements may then be used by the stabilisation module 26 to stabilise the camera 22.

In this embodiment, the camera 22 is coupled to the transmitter 28 such that images captured by the camera 22 are sent to the transmitter 28.

In operation, the camera 22 captures images of the aircraft 10 during the aircraft's approach to the runway 8. These images are sent from the camera 22 to the transmitter 28. The transmitter 28 then transmits the images to an entity remote from the glide path indicator 2 for use by that entity. For example, in some embodiments, the images are transmitted to a computer or other device that is configured to display the received images. The images may be displayed as video. The images may be displayed to a Landing Signals Officer (LSO) or other appropriately qualified person, who may review and analyse the displayed images to assess whether or not the aircraft 10 is correctly established on the glide path 14. The LSO may use their experience and training in this assessment. The LSO may then communicate with the pilot of the aircraft 10 to provide feedback regarding the aircraft's approach to the runway 8. The LSO may also, if necessary, specify corrective action needed to be performed by the pilot in order to position the aircraft 10 on the glide path 14. Using information provided by the LSO, the pilot may then perform a corrective action so as to establish the aircraft 10 on the glide path 14.

In some embodiments, the images captured by the camera 22 may be processed by appropriate processing means, for example, to overlay or superimpose an indication of the glide path 14 onto the captured camera images. This processing of the camera images may be performed remotely from the glide path indicator 2, or alternatively by the glide path indicator 2, for example, by one or more processors integrated with the glide path indicator 2.

In this embodiment, the screen 24 is an opaque screen located between the light emitter 20 and the camera 22 and arranged so as to prevent or oppose light emitted by the light emitter 20 from being directly received by the camera 22. This advantageously tends to provide that the light emitted by the light emitter 20 does not adversely affect the images generated by the camera 22.

An advantage provided by the above described glide path indicator is that the images generated by the camera facilitate in the assessment, by a suitably trained/experienced individual, of the aircraft's approach to the runway. This assessment may be used to determine any corrective action required to be performed by the pilot to establish the aircraft on the desired glide path and to land the aircraft on the optimum landing position on the runway. Thus, the safe landing of the aircraft is facilitated or the aircraft may be waved off to protect the pilot, aircraft and ship from an incorrectly aligned landing. The provided glide path indicator tends to be particularly useful at night, or in low visibility conditions (e.g. low light levels).

Advantageously the light emitter and the camera are stabilised to account for the motion of the aircraft carrier. Thus, a constant, steady glide path is provided to the pilot of the aircraft, and the facing of the camera is always directed along the defined glide path, thereby facilitating assessment of the aircraft's approach. Furthermore, the light emitter and the camera are stabilised by common stabilisation means. This tends to provide for more accurate assessment by the Landing Signal Officer.

Apparatus, including the processors of the stabilisation module 26 and/or any image processors, for implementing the above arrangement may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

In the above embodiments, the glide path indicator is implemented onboard an aircraft carrier. However, in other embodiments the glide path indicator is implemented in a different way. For example, in some embodiments, as opposed to being implemented onboard an aircraft carrier, the glide path indicator is instead located on land (e.g. on the ground near an land-based runway), on an aircraft, on a water-based vehicle or amphibious vehicle other than an aircraft carrier, or on a different type of structure such as an oil/gas platform.

In the above embodiments, the light emitter is, in effect, a pulsating visual approach slope indicator" (PVASI). However, in other embodiments light emitter operates in a different manner to define the glide path. For example, in other embodiment, the light emitter may be, in effect, a standard visual approach slope indicator (VASI), a precision approach path indicator (PAPI) or a tri-coloured VASI.

In the above embodiments, the light emitter emits light having the above described signal format. However, in other embodiments, the light emitter is configured to emit light having a different signal format. For example, the colours and/or the patterns (solid, flashing etc.) of the light emitted by the light emitter may be different to those described above.

In the above embodiments, the light emitter and the camera are stabilised to remove the effects of the ship's roll and pitch and provide the pilot with stable visual information relating to the approach angle. However, in other embodiments, one or both of the light emitter and the camera are not stabilised.

In the above embodiments, the light emitter and the camera are stabilised by a common stabilisation module integral to the glide path indicator. However, in other embodiments the light emitter and the camera are stabilised by separate, independent stabilisation modules. In some embodiments, one or more of the stabilisation modules for stabilising the light emitter and the camera may be located remotely from the glide path indicator.

In the above embodiments, light emitted by the light emitter is prevented or opposed from being directly received by the camera by the screen. However, in other embodiments, this isolation between the light emitter and the camera is achieved in a different way. For example, in some embodiments, a filter may be applied to the camera to prevent light having the same wavelength as that emitted by the light emitter from entering the camera. In some embodiments, time-based switching is implemented so that the glide path indicator rapidly switches between project a glide path and capturing a camera image.

In the above embodiments, the images captured by the camera are wirelessly transmitted to a location onboard the aircraft carrier where they may be displayed to and analysed by an LSO. However, in other embodiments, one or more of the camera images may be transmitted in a different appropriate way, for example, via a wired communication link. Also, in some embodiments, one or more of the images may be transmitted to a different location, for example, remotely from the aircraft carrier. Also, in some embodiments, one or more of the images may be for a different purpose, for example, for further image processing and/or storage. Image processing and/or image storage may be performed by, or remotely from, the glide path indicator.

It will be understood that the invention may also be utilised as a training aid for a training pilot, wherein the Landing Signal Office or training instructor provides guidance to the training pilot whilst landing on a runway. Furthermore, the invention may be used in a simulation environment, wherein a simulated aircraft is controlled by a training pilot who reacts to a computer generated simulation of landing conditions approaching a simulated virtual runway forming part of an aircraft carrier and a virtual light emitter and virtual camera provide the training pilot with feedback as to the current landing approach with respect to the optimum landing position the runway and required glide path

The invention claimed is:

1. A glide path indicator configured to be mounted on a vehicle, said glide path indicator comprising:
    a light emitter configured to emit a visible light signal that defines a glide path for use by a pilot of an approaching aircraft;
    a camera configured to capture images of the approaching aircraft, the camera being arranged such that at least part of the glide path defined by the light emitter is located within a field of view of the camera; and
    a common stabilisation module configured
        to stabilise the light emitter so as to reduce or eliminate the effects of the vehicle's motion on the glide path, and
        to stabilise the camera so as to reduce or eliminate the effects of the vehicle's motion on the camera's field of view.

2. A glide path indicator according to claim 1, wherein the camera is arranged such that the glide path defined by the light emitter is wholly located within the field of view of the camera.

3. A glide path indicator according to claim 1, wherein the vehicle is a ship.

4. A glide path indicator according to claim 1, wherein the light emitter and the camera are coupled together such that the position and orientation of the camera with respect to the light emitter are fixed.

5. A glide path indicator according to claim 1 and further comprising means for preventing or opposing light emitted by the light emitter from being received by the camera.

6. A glide path indicator according to claim 5, wherein the means for preventing or opposing light emitted by the light emitter from being received by the camera comprises means selected from the group consisting of:
    an opaque screen located between the light emitter and the camera;
    a filter configured to filter light being received by the camera, the filter being configured to block only light having a wavelength equal to that of the light emitted by the light emitter; and
    a switch operable to switch the glide path indicator between a first state and a second state, the first state being a state in which the light emitter emits light and the camera does not capture images, and the second state being a state in which the light emitter does not emit light and the camera captures images.

7. A glide path indicator according to claim 1 and further comprising a transmitter configured to transmit, to an entity remote from the glide path indicator, the images captured by the camera.

8. A glide path indicator according to claim 1, wherein the light emitter is a pulsating visual approach slope indicator.

9. A vehicle comprising a glide path indicator, the glide path indicator being in accordance with claim 1.

10. A vehicle according to claim 9, wherein the vehicle is a ship.

11. A method of assessing a descent profile of an aircraft during a landing operation, the method comprising:
    providing a glide path indicator configured to be mounted on a vehicle, the glide path indicator comprising:
        a light emitter configured to emit a visible light signal that defines a glide path for use by a pilot of the aircraft during the landing operation; and
        a camera configured to capture images of the aircraft during the landing operation, the camera being arranged such that at least part of the glide path defined by the light emitter is located within a field of view of the camera;
    emitting, by the light emitter, a visible light signal so as to define the glide path for use by the pilot of the aircraft;
    imaging, by the camera, the aircraft; and
    using the images of the aircraft, determining an assessment of a descent profile of the aircraft
        a common stabilisation module configured
            to stabilise the light emitter so as to reduce or eliminate the effects of the vehicle's motion on the glide path, and
            to stabilise the camera so as to reduce or eliminate the effects of the vehicle's motion on the camera's field of view.

12. A method according to claim 11, the method further comprising:
    using the determined assessment, determining an action that, if performed by the aircraft, would establish the aircraft on the glide path; and
    controlling the aircraft to perform the determined action.

* * * * *